Jan. 5, 1954
J. SAFRAN
2,664,934
WHEEL TRACTION DEVICE
Filed Sept. 7, 1951
FIG. 1.
FIG. 2.
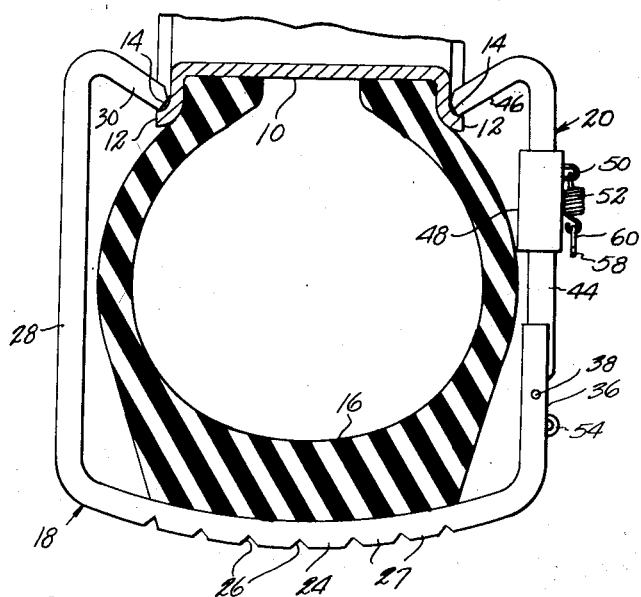
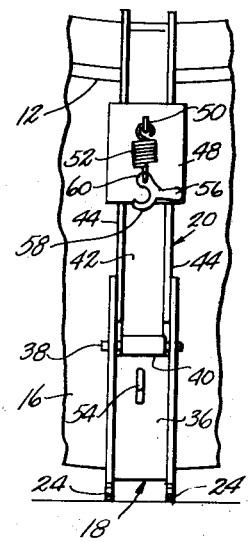
FIG. 3.
FIG. 4.   FIG. 5.
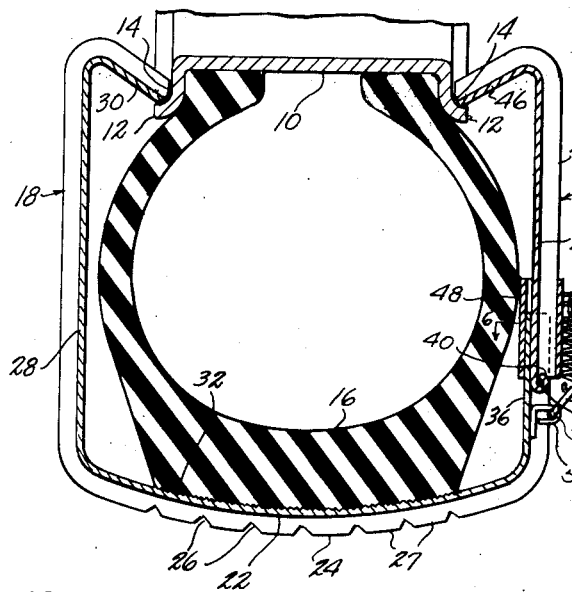
FIG. 6.
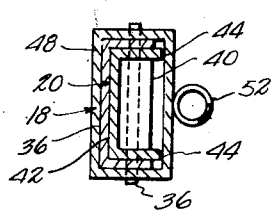
INVENTOR
JACOB SAFRAN,
BY
McMorrow, Berman & Davidson
ATTORNEYS Patented Jan. 5, 1954

2,664,934

UNITED STATES PATENT OFFICE 2,664,934

WHEEL TRACTION DEVICE

Jacob Safran, Los Angeles, Calif.

Application September 7, 1951, Serial No. 245,540

2 Claims. (Cl. 152—225)

This invention relates to traction devices, and more particularly, has reference to a traction device applicable to a conventional automotive vehicle wheel rim and tire casing.

The difficulty of driving an automotive vehicle out of snow or mud in which the vehicle is mired is well appreciated. It is the main object of the present invention, accordingly, to provide a traction device applicable to each rear wheel of the vehicle, that can be swiftly applied to a wheel and which will be operative to overcome wheel slippage, thus to permit the vehicle to be driven out of the mud or snow under its own power.

It is a further important object of the present invention to provide a device of the type stated which can be applied to the vehicle wheel without the use of any tools, and without requirement of jacking-up or rotating the wheel.

Another important object is to provide a device as described that can be removed with a speed and facility equal to that obtaining when the device is being mounted upon the wheel.

Yet another object is to provide a wheel traction device novelly formed to grip efficiently not only the road surface, but also the tire casing of the wheel.

Still another object of the invention is to provide a device of the character stated comprising a pair of hingedly connected members novelly adapted to be interlocked against relative movement when they are applied to the automotive wheel, through the medium of a sleeve which in one position thereof laps both members, and is yieldably retained in said position by a spring means connected at one end to said sleeve, and having a tension-producing, separable, cam latch connection to one of said members.

A still further object of the invention is to provide a device as described that will be rugged, simply designed, and capable of manufacture at relatively low cost.

Other objects will appear from the following description, and the claims appended thereto, and from the annexed drawing, in which like reference characters designate like parts throughout the several views, and wherein:

Figure 1 is a transverse sectional view through an automotive vehicle wheel and its associated tire casing, a portion of said wheel being broken away, the device constituting the present invention being shown in side elevation as it appears when applied to the wheel, the locking sleeve of the invention being illustrated in inoperative position;

Figure 2 is an edge elevational view of the device as viewed from the right of Figure 1, the wheel and tire casing being shown fragmentarily, in side elevation;

Figure 3 is a transverse sectional view through the vehicle wheel, a portion of said wheel being broken away, the device being illustrated in longitudinal section and the locking sleeve being illustrated in its operative position, to lock the hingedly connected members against relative movement;

Figure 4 is a view similar to Figure 2, in which the locking sleeve is illustrated in operative position, the vehicle wheel not being shown;

Figure 5 is a transverse sectional view through the traction device, showing the inner side of the locking sleeve; and Figure 6 is an enlarged cross sectional view taken on line 6—6 of Figure 3.

Referring to the drawings in detail, a conventionally formed automotive vehicle wheel rim has been designated 10, and at opposite sides thereof is formed with peripheral casing-engaging flanges 12 the outer edges of which are extended outwardly to define therein annular, exteriorly disposed recesses 14. A tire casing 16 is engaged between the flanges, completing the formation of a vehicle wheel of conventional construction which considered per se constitutes no part of the present invention.

The traction device constituting the present invention includes a pair of hingedly connected strap members generally designated 18 and 20 respectively.

Considering first the formation of the member 18, this is integrally formed from a single piece of channeled material, shaped intermediate opposite ends thereof to provide a transverse leg 22 curved longitudinally into approximate correspondence with the transverse curvature of the traction surface of the casing 16. Spaced, parallel side walls 24 extend outwardly from the opposite longitudinal edges of the leg 22, and are respectively formed with longitudinal series of notches 26 defining therebetween spaced surface-gripping teeth 27. As a result, the leg 22 of the member 18 can be properly considered as having parallel, arcuate rows of teeth spaced circumferentially of the tire casing and extending transversely across the traction surface of said casing.

Formed integrally with the leg 22, at one end thereof, is an elongated side leg 28, which is preferably of straight formation from end to end thereof, and which is proportioned to extend along and in spaced relation to the inner side wall of the casing 16, radially of the vehicle wheel.

At its inner end, the elongated side leg 28 is integral with a lateral extension 30, that is arranged at a pronounced acute angle to the side leg, and is extended inwardly in the direction of the rim 10 so as to be engaged tightly against the inside flange 12, in the recess 14 of said flange.

On the inner surface of the transverse leg 22 I provide a means adapted to grip the traction surface of the casing 16 so as to prevent relative movement between said casing and the bottom leg. To this end, the inner face of the leg 22 is roughened as at 32 to provide a rasp-like surface that engages the tread of the tire casing when the device constituting the present invention is applied in the manner shown in Figures 1 and 3.

At its other end, the transverse leg 22 is integral with a short side leg 36, arranged parallel to the side leg 28, the side leg 36 being disposed radially of the automotive vehicle wheel and extending along the outer side wall of the tire casing, in spaced relation thereto.

Extended transversely of the short side leg 36, and spaced from the free end of said leg, is a hinge pin 38, the ends of which extend through the respective side walls of the leg 36 and project therebeyond, as best seen from Figures 2, 4, and 5.

The hinge pin 38 is adapted to provide a hinge connection between the members 18 and 20, and considering now the formation of the member 20, this is also of channeled formation throughout, though slightly narrower in width than the member 18. The inner end of the member 20 is received within the free end of the short leg 36 of the member 18, and is formed with a rolled hinge tongue 40 extending around the hinge pin 38. The tongue 40 is integral with a straight web 42 of the member 20, integral with straight, parallel side walls 44.

At its outer end, the member 20 is provided with a lateral extension 46, which like the lateral extension 30, is disposed at a pronounced acute angle to its associated strap member, and is extended inwardly in the direction of the outside rim flange 12 in which it is adapted to be releasably engaged, the extension 46 being engageable in the recess 14 of the outside rim flange.

Mounted for sliding movement longitudinally of the strap member 20 is a sleeve 48 of rectangular cross sectional configuration, which in one position thereof, is inoperatively disposed, said inoperative position of the sleeve being illustrated in Figures 1 and 2. Fixedly mounted upon the sleeve is an eye 50 in which is hooked one end of a coil spring 52. An eye 54 is rigidly mounted upon the short leg 36 of the member 18, contiguous to the hinge pin 38 for connecting the other end of the spring separably to the member 18.

In effecting the separable connection of the spring 52 to the member 18, I provide a cam latch means carried by the spring, and releasably engageable with the eye 54. Said means comprises a latch pin having a handle 56, and integrally formed with a curved cam arm 58 and a finger 60, said finger and arm diverging from the handle 56, as best shown in Figure 2. The finger 60 is formed with an opening in which the other end of the spring 52 is hooked.

When the sleeve 48 is adjusted to the operative position thereof shown in Figures 3-5, the latch pin is pivotally swung about its connection to the spring, and the cam arm 58 is engaged in the eye 54. Thereafter, the handle 56 is swung in a clockwise direction when viewed as in Figure 4, to fully engage the cam arm in the eye 54. This has the effect of pulling the spring downwardly toward the eye 54, so as to place the spring under tension. As a result, the sleeve 48 is securely but releasably held in a position in which it laps the side leg 36 of the member 18, and the inner end of the member 20, so as to hold the members 18 and 20 against relative movement after they have been applied to the vehicle wheel.

The final result is to engage the traction device tightly against the vehicle wheel rim and tire casing, said device being securely held against movement relative to the casing by means of the rasp-like surface 32.

Subsequently, when power is applied to the wheel, the teeth 21 will dig into the mud or snow in which the wheel is mired, so that the vehicle may be driven out of the snow or mud under its own power.

To remove the traction device from the wheel after the emergency conditions no longer exist, it is necessary merely that the handle 56 be swung counter-clockwise when viewed as in Figure 4, disengaging the cam arm 58 from the eye 54, and permitting slidable adjustment of the sleeve 48 to the inoperative position thereof seen in Figures 1 and 2.

It is preferred that only one of the devices be applied to each rear wheel, since it has been found that one device upon a wheel will be sufficient to give the wheel the desired amount of traction necessary to drive the vehicle out of the snow or mud in which it is bogged down.

I believe it will be readily apparent that a traction device formed in accordance with the present invention can be applied to a vehicle wheel with maximum speed and facility. It is merely necessary that the extension 30 be placed in engagement with the inside rim flange 12, while the sleeve 48 is in the inoperative position thereof shown in Figures 1 and 2, so as to permit free swinging movement of the members 18 and 20 relative to one another.

Thereafter, the transverse leg 22 of the member 18 is placed in engagement with the traction surface of the tire casing 16, and the member 20 is swung into substantial longitudinal alignment with the leg 36 of the member 18, so as to engage the lateral extension 46 in the recess 14 of the outside rim flange 12. The user then slidably adjusts the sleeve 48 longitudinally of the member 20, to the position illustrated in Figures 3-5, and by operating the cam latch pin in the manner described above, hooks the spring to the eye 54.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. A wheel traction device for application to a vehicle wheel equipped with a tire casing having a tread and side walls and with a rim having peripheral flanges at opposite sides thereof, comprising a pair of rigid one-piece strap members complementing one another to straddle said casing, one of the members being formed with a transverse leg overlying the tread and with a long and a short side leg respectively extending from opposite ends of the transverse leg to overlie the side walls of the casing, the other member being generally straight to overlie one only of said side walls and being hingedly joined to the short side leg; lateral extensions extending inwardly of said rim from and related acutely to the long side leg and said other strap member to engage the respective flanges when the strap members are disposd to straddle the casing; and a sleeve slidably mounted upon said other strap member to shift over the hingedly joined ends of the members, a spring exteriorly of said sleeve and having one end connected to said sleeve, and a latch means on the other end of said spring and releasably engageable with a holding element carried by the short side leg to lock the members against relative movement when positioned to straddle the casing.

2. A wheel traction device for application to a vehicle wheel equipped with a tire casing having a tread and side walls and with a rim having peripheral flanges at opposite sides thereof, comprising a pair of rigid one-piece strap members complementing one another to straddle said casing, one of said members being formed with a transverse leg overlying the tread and with a long and a short side leg respectively extending from opposite ends of the transverse leg to overlie the side walls of the casing, the other member being generally straight to overlie one only of said side walls and being hingedly joined to the short side leg; lateral extensions extending inwardly of said rim from and related acutely to the long side leg and said other strap member to engage the respective flanges when the strap members are disposd to straddle the casing; teeth on opposite faces of the transverse leg respectively proportioned to grip the tread and a surface on which the wheel is supported, to prevent relative slippage between the casing, the transverse leg, and said surface; a sleeve slidably mounted upon said other strap member to shift over said hingedly joined ends; a spring connected at one end to the sleeve; an eye on the short side leg; and a latch pin carried by the spring and including a handle, a first arm rigid with the handle and connected to the other end of the spring, and a second arm rigid with the handle and diverging from the first-named arm, said second arm being proportioned for releasable engagement in said eye to place the spring under tension and hold the sleeve over the hingedly joined ends, thus to interlock the members against relative movement when positioned to straddle the casing.

JACOB SAFRAN.

References Cited in the file of this patent
UNITED STATES PATENTS

| Number | Name | Date |
| --- | --- | --- |
| 1,188,330 | Schaefer | June 20, 1916 |
| 1,772,096 | Diamond | Aug. 5, 1930 |
| 1,775,211 | Pearson | Sept. 9, 1930 |
| 2,549,573 | Clark | Apr. 17, 1951 |